April 20, 1965 P. RIZZO 3,179,427
RETAINER FOR CRANKSHAFTS AND VEHICLE AXLES IN GENERAL
Filed April 12, 1963

PEDRO RIZZO
INVENTOR

Karl F. Ross
AGENT

3,179,427
RETAINER FOR CRANKSHAFTS AND VEHICLE AXLES IN GENERAL
Pedro Rizzo, Sao Paulo, Brazil, assignor to Wylerson S/A. Industria e Comercio, Sao Paulo, Brazil
Filed Apr. 12, 1963, Ser. No. 272,576
2 Claims. (Cl. 277—199)

It is the object of the present invention to provide an improved retainer for crankshafts and vehicle axles in general, which, owing to its design and to the versatility of its application, yields new and unexpected results, is practical and of considerable usefulness.

This new retainer, which is of the bipartite type, has its cross section or profile carefully designed in order to offer an absolute sealing action around the axle and between the contacting surfaces of the two parts, thereby avoiding any possibility of oil leakage as frequently occurs with the conventional two-part retainers.

In contrast, the retainer constituting the subject of the invention makes use of a uniquely shaped reinforcing ring or belt, which affords a greater planarity and an increased resistance and durability which, together with other improved characteristics, keep the retainer constantly in good working condition.

Figure 1:
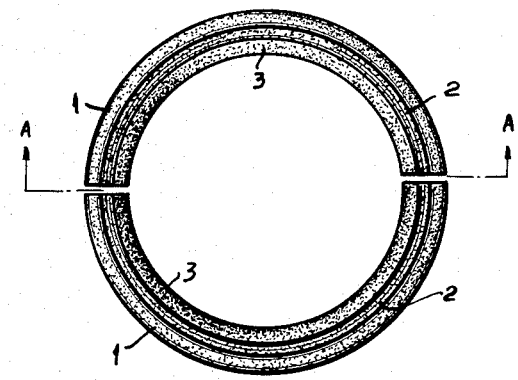
Figure 2:
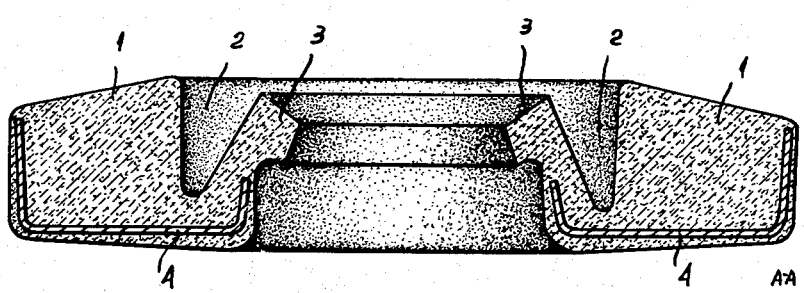

In the enclosed drawing which illustrate the present invention:

FIG. 1—is a top view of the improved oil retainer or seal according to the present invention; and FIG. 2—is a view taken along the line A—A as indicated in FIG. 1.

According to the drawing, the improved oil retainer or seal for crankshafts and vehicle axles in general, of the present invention, is primarily formed of the ring 1, made of rubber, neoprene or any other sealing material, and composed of two parts, so that on one of its surfaces, and near its inner profile, it defines a circular groove 2 of relatively great depth forming an inside circular inclined rim 3 having an angular shape.

The above referred to ring 1 is also equipped, near the circular gap 2, with an imbedded metal ring 4, having a generally U-shaped cross-section, of which one arm runs along the side external border of the ring, over substantially all of its height, while the other arm follows the internal border of same of the ring, but does not extend into the circular rim 3 free.

In the retainer formed thereby, the ring gap 2 offers great flexibility, lesser friction, and consequently lesser heating allowing a perfect adjustment of the circular rim 3 around the axle to which it is applied, thereby promoting excellent sealing conditions.

On the other hand, the metal ring or annulus 4, entirely imbedded as it is within the retainer, acts as an extraordinary reinforcement of same, affording greater resistance, indeformability and consequently a practically unlimited durability.

It is also to be mentioned that the new oil retainer, either vulcanized as two pieces, or cut after vulcanization, is mounted in place by a slight pressure between the two parts, exerted in order to prevent leakages and offer better durability.

What I claim is:

1. Oil seal comprising a bipartite annular body of resiliently deformable material defined by two generally semicircular segments forming a throughgoing opening adapted to receive a shaft, said segments being generally coplanar with said opening having an axis perpendicular to the plane of said segments, each of said segments being formed with a semicircular channel proximal to said opening on the same side of said body, thereby defining with the inner periphery of said opening a cuff adapted to surround and bear upon said shaft; and respective semicircular reinforcing bands of generally U-shaped cross-section radially spanning said channel and wholly imbedded in said segments, said U-shaped bands having bight portions lying generally in a plane perpendicular to the axis of said opening and a pair of continuous annular arms rising upwardly from and integral with the respective bight portions adjacent the outer and inner peripheries of said segments, the arm of each segment adjacent to the inner periphery thereof being shorter than the other arm of the respective band and rising only partly into said cuff.

2. An oil seal as defined in claim 1 wherein said channel has a generally V-shaped cross-section and said cuff is inclined toward said axis, said bands being disposed in said segments remote from said cuff, said cuff having an inwardly extending annular flange angularly protruding from said body.

References Cited by the Examiner
UNITED STATES PATENTS

| | | | |
|---|---|---|---|
| 2,249,141 | 7/41 | Johnson | 277—152 |
| 2,630,343 | 3/53 | Jones et al. | 277—152 |
| 2,647,002 | 7/53 | Brummer | 277—206 |
| 2,719,743 | 10/55 | Brummer et al. | 277—206 |

EDWARD V. BENHAM, *Primary Examiner.*